Dec. 15, 1936.  C. WURM ET AL  2,064,049

COMBINED MOVING PICTURE AND TALKING MACHINE

Filed Nov. 21, 1935

CARL WURM
ROBERT GOLDSTEIN
INVENTORS

BY Mason, Fenwick & Lawrence
ATTORNEYS

Patented Dec. 15, 1936

2,064,049

UNITED STATES PATENT OFFICE 2,064,049

COMBINED MOVING PICTURE AND TALKING MACHINE

Carl Wurm and Robert Goldstein, Brooklyn, N. Y., assignors of thirty per cent to Harry R. Walls, Elmhurst, N. Y., and thirty per cent to Martin Bermont, Brooklyn, N. Y.

Application November 21, 1935, Serial No. 50,956

2 Claims. (Cl. 179—100.3)

This invention relates to improvements in moving picture machines and has more particular relation to improvements in such machines as reproduce sound which has been previously recorded on the photographic film with the pictures.

The object of the invention is to provide means that may be attached to the ordinary moving picture machine to accommodate and reproduce sound as an accompaniment to the pictures themselves.

A further object of the invention is to provide sound producing devices as an accompaniment to moving pictures for the "home" machines.

A still further object of the invention is to provide an attachment for a moving picture machine which will receive the film passing through such machine and reproduce sound therefrom.

Another object of the invention is to provide improved film guiding and pressing devices used in connection with a mechanism for properly guiding the sound track of the film between the source of light and a photo-electric cell.

In the accompanying drawing, forming part of this specification,

Figure 1:
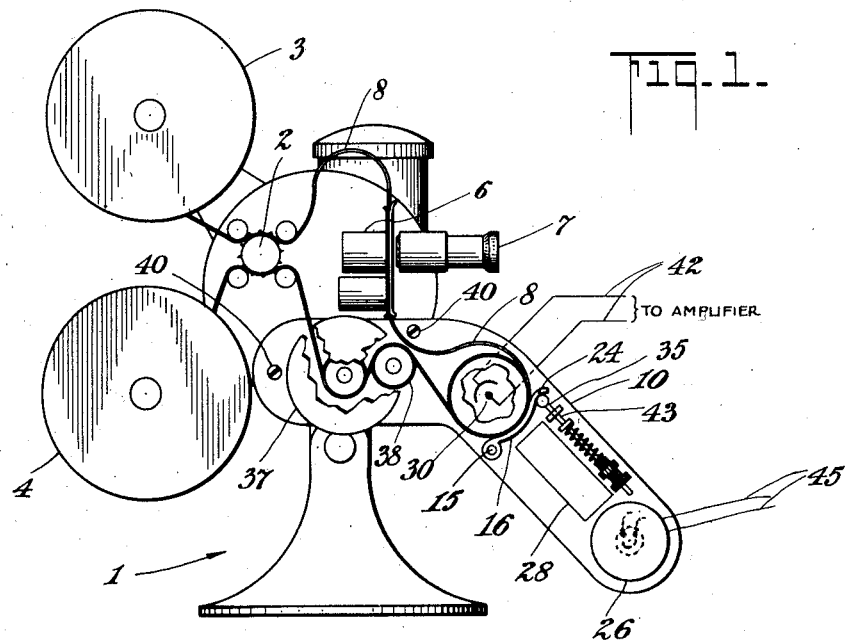
Fig. 1 represents a side elevation of a picture projecting machine with our improved attachment applied thereto.
Figure 2:
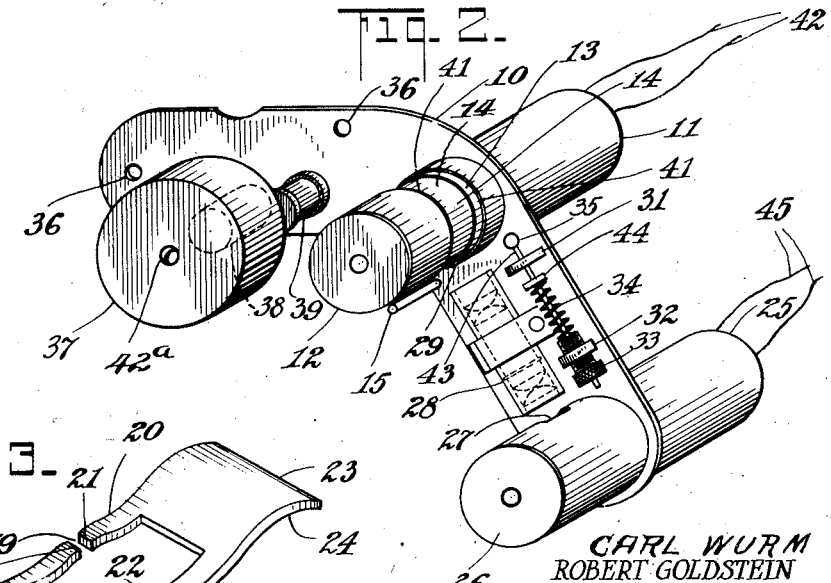
Figure 2 represents a perspective view of our improved attachments for producing sound separated from the picture producing machine.
Figure 3:
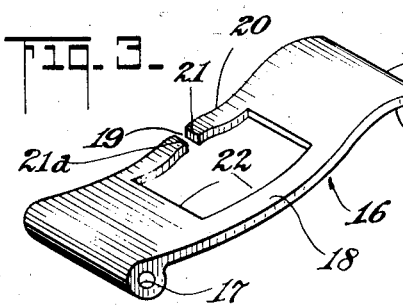
Figure 3 represents a detail perspective view of our improved presser plate for holding the film accurately in the path of the light travelling to the photo-electric cell.

It has heretofore been the practice to run the 16 m. m. film which is designed for "home" use through a series of guiding, tensioning and holding rollers in order that the film which contains both the picture "path" and the sound "path" to the side of the same, will be guided accurately past the point where the actuating light to the "photo-electric cell" will be intercepted to a greater or less degree. This as is well known in the art is the method of producing sound from the same film upon which the moving picture scenes are recorded.

Because of the very small dimensions of the light obstructing and sound producing imprints on the film near one edge, it is imperative that the film be guided past the light aperture to the photo-electric cell in such a way that there is no possibility of the film moving sidewise or buckling in any way as any such lateral movement or buckling will cause the transmission of light through the "photo-electric cell" to become unintelligible.

This becomes particularly an absolute necessity in the so-called "home" films which are of the 16 m. m. dimension as the space allotted to the sound path is very small and the slightest deviation of the film from its path becomes fatal to proper sound production.

With this thought in mind and also with the further necessity of producing a cheap structure for "home" use, the present inventors have designed the arrangement and mounting of devices on a single base plate that may be attached to a moving picture machine and has provided a very peculiar presser foot for holding the film taut over the light transmitting orifice.

The present invention may be attached to any particular type of machine in which the angular base plate 10 may be secured by screws or bolts 40 which pass through apertures 36 formed in this plate and engage the frame of the picture projecting machine. This picture projecting machine in itself forms no part of the present invention and is old and well known in the art.

The film 8 is led from the supply reel 3 through suitable feeding rollers including a tooth roller 2. This film passes into the usual guiding chute 6 and is fed therethrough by an intermittent motion device old and well known in the art.

In its downward path through the chute 6, the film passes the lens 7 by means of which the picture is projected on the screen.

When the film 8 leaves the lower end of the chute 6, it is formed into a loop 8 for the purpose of allowing an intermittent movement at the picture lens, but a constant movement at the point where this film is drawn over the tube 12 which contains the photo-electric cell 30. An annular path 14 is formed about this tube 12 and is provided at each lateral edge with a guiding enlargement 13 upon which the edge of the film rests. This formation results in annular shoulders 41 between which the film passes and which prevent any lateral movement of the same. An aperture 29 is formed through the inner enlargement 13 at a point to permit light from the light tube 26 passing to the photo-electric cell after first issuing through the aperture 27 in the tube and then passing through the optical unit 28 which comprises lenses so arranged as to concentrate the beam of light on the aperture 29.

The ray of light from the lamp of any desired type is directed by the optical unit 28 on the film passing over the flanges or flange 13 in such a way that the sound printing upon the film is interposed directly between this ray of light and the aperture 29 of the cell housing. This photo-electric cell 30 which is best shown in Fig. 1 is of the usual type and is connected by wires 42 to any desired form of amplifier, the same forming no part of the present invention. The interval between the picture passing the lens 7 and the sound path record passing the opening 29 is approximately the length of 24 pictures as this has been found to be the desired synchronism between the picture and sound. The film 8 is drawn snugly about the flanges 13 by the aforesaid sprocket feed 2. In order, however, to provide the proper tension and also steady the movement of the film, the latter is passed over a guiding roller 39 and a friction roller 38. This latter roller is fast to a fly wheel 37 which is mounted for free rotation upon a stud 42ª secured to the frame 10. By this means, the movement of the fly wheel 37 will cause a steady forward movement of the film, drawing it tightly about the flanges 13 and past the aperture 29. As the loop 8 in the film, however, must be maintained, we provide our improved presser foot 16. This foot is formed from a curved plate arranged to approximately conform to the curvature of the flanges 13 and formed with an aperture 22 so that said plate will only press the film at the side edges and will not in any wise scratch or mar the film in the path of the pictures. In order to concentrate the pressure upon opposite sides of the orifice 29 to prevent any accidental buckling or uneven movement of the film, we sever the plate as at 19, this severance forming two spring pressure fingers 21. These fingers are given a slight outward curve as at 21ª for preventing the sharp outer edges of the fingers 21 from engaging, and for scratching the film and bringing the pressure onto a portion of the fingers near their ends which is absolutely smooth.

The plate 10 is formed at one end with an aperture lug 17 which is mounted upon a pin 15 secured to the frame 10. This allows the pressure foot to occupy a position in which the inner side 28 of the foot is approximately opposite the sound path. The opening 22 is opposite the picture path and the portion 18 is opposite the part of the film containing the sprocket apertures. The presser foot 16 is held in position in contact with the film by a presser ball 35 which engages the presser foot within the curvature 24 at the free end of the foot. This ball is mounted upon a rod 43 guided in lugs 31 and 32 mounted on the angular frame 10. A screw 33 is mounted in the lug 32 and is hollowed to receive one end of a coil spring 34 bearing at its opposite end against a washer 44 mounted on the rod 43. The adjustment of the nut 33 will thus increase or decrease the tension on the ball 35 and provide the desired tension of the presser foot upon the film.

It will be understood the arms 21 become spring arms when the aperture 19 is formed and therefore each of the same exerts an independent pressure on the film to hold it perfectly taut over the aperture 29 to prevent any possibility of buckling at this point. Such buckling would be fatal as the small dimensions of the obstructions in the light path causes the slightest divergence of the film to transpose an entirely erroneous sound indication to the photo-electric cell.

Wires 42 lead from the photo-electric cell 30 out of the end of tube 11 which is secured to the frame 10 and through which the photo-electric cell is introduced into the tube 12. Wires 45 lead through the tube 25 secured to the plate 10 and from thence to the tube 26 and the electric light which is preferably of tubular construction.

It will be seen from the above that we provide in a single unit a "talking" attachment for handling combined picture and talking record films and capable of being attached to most of the ordinary forms of moving picture machines now on the market.

The construction is such that the ordinary handling and feeding of the film is in no wise disarranged and the addition of a source of light and the photo-electric cell is such that a mere loop formed in the film and led through the unit, results in the talking portion of the film being made effective in combination with any particular type of moving picture machine.

The film 8 after leaving the roller 38 passes over guiding rollers and beneath the toothed sprocket roller 2 to effect the forward feed of the film. The film is then wound up on the storage roller 4. These latter operations are old and well known in the art.

The holes 36 in the plate 10 accommodate most of the different forms of picture machines, but if desired it will be understood that differently located holes or slots may be formed in the plate to adapt the plate to different forms of machines.

It will be seen that the production of the devices above described have greatly simplified the usual construction of mechanism for handling sound producing films, as this mechanism has heretofore consisted of a series of friction and guiding rollers and feeding devices. This is particularly desirable in the present type of machine for handling the 16 m. m. form of film as simplicity and cheapness are the main factors in the production of such apparatus.

Having thus described our invention what we claim is:

1. A means for adapting a motion picture projector to reproduce sound vibrations photographically recorded on film designed for use in said projector, and comprising a frame adapted to be connected detachably to said projector, a tube containing a photo-electric cell and mounted on said frame to form a curved support for a loop in the moving film, said tube being provided with a peripheral recess of the same width as the width of the film used in the projector and forming a guideway for said film, and the film supporting wall of said recess being provided with a light transmitting slit, a presser plate pivoted at one end to said frame and slit to form spring presser fingers contacting with said film on opposite sides of said slit, and means engaging the free end of said plate to press said fingers against said film.

2. A means for adapting a motion picture projector to reproduce sound vibrations photographically recorded on film designed for use in said projector, and comprising a frame adapted to be connected detachably to said projector, a tube containing a photo-electric cell and mounted on said frame to form a curved support for a loop in the moving film, said tube being provided with a peripheral recess of the same width as the width of the film used in the projector and forming a guideway for said film, and the film supporting wall of said recess being provided with a light transmitting slit, a presser plate pivoted at one end to said frame and slit to form spring presser fingers contacting with said film on opposite sides of said slit, means engaging the free end of said plate to press said fingers against said film, and means for varying the pressure of the last named means against said presser plate.

CARL WURM.
ROBERT GOLDSTEIN.